United States Patent [19]

Herz et al.

[11] Patent Number: 5,335,019
[45] Date of Patent: Aug. 2, 1994

[54] DIGITAL VIDEO DATA QUANTIZATION ERROR DETECTION AS APPLIED TO INTELLIGENT DYNAMIC COMPANDING

[75] Inventors: William Herz, Newark; David Rossmere, San Jose, both of Calif.

[73] Assignee: Sony Electronics, Inc., Park Ridge, N.J.

[21] Appl. No.: 4,687

[22] Filed: Jan. 14, 1993

[51] Int. Cl.$^5$ .............................................. H04N 5/21
[52] U.S. Cl. .................................. 348/607; 348/720; 371/67.1
[58] Field of Search ............... 358/160, 133, 166, 135, 358/136; 341/94, 95, 160; 375/122; 348/572, 573, 607, 639, 720; 371/47.1, 67.1; H04N 5/208, 5/14, 5/21

[56] References Cited

U.S. PATENT DOCUMENTS

| | | | |
|---|---|---|---|
| 4,288,815 | 9/1981 | Miles | 348/620 |
| 4,511,922 | 4/1985 | Lewis, Jr. | 358/37 |
| 4,654,695 | 3/1987 | Fling | 358/133 |
| 4,965,668 | 10/1990 | Abt et al. | 348/574 |
| 5,041,830 | 8/1991 | Abe | 341/77 |
| 5,046,122 | 10/1991 | Nakaya | 341/95 |
| 5,157,489 | 10/1992 | Lowe | 358/133 |

FOREIGN PATENT DOCUMENTS

| | | | |
|---|---|---|---|
| 1441484 | 11/1988 | European Pat. Off. | 341/95 |
| 484946 | 5/1992 | European Pat. Off. | 341/95 |
| 0065719 | 3/1988 | Japan | 341/94 |
| 0228334 | 9/1989 | Japan | 341/94 |

*Primary Examiner*—Mark R. Powell
*Assistant Examiner*—Chris Grant
*Attorney, Agent, or Firm*—Irell & Manella

[57] ABSTRACT

Under one embodiment, a first and a second similarly constituted detector, and an OR gate coupled to the two detectors, are provided to a digital video system. The first detector detects quantization errors of numerically adjacent values in vertically adjacent pixels of a current frame. The second detector detects quantization errors of numerically adjacent values in horizontally adjacent pixels in the current frame. The OR gate is used to determine whether quantization errors of numerically adjacent values are detected in at least one of the two spatial dimensions of pixel adjacency in the current frame. In one variation of this embodiment, a potential quantization error lookup table that supports concurrent lookups for vertically and numerically adjacent quantization error detection as well as horizontally and numerically adjacent quantization error detection is used and shared between the two detectors. In an expanded embodiment, a third similarly constituted detector is further provided, and coupled to the OR gate. The third detector detects quantization errors of numerically adjacent values in temporally adjacent pixels of successive frames. The OR gate is used to determine whether quantization errors of numerically adjacent values are detected in at least one of the three dimensions of pixel adjacency. In a further expanded embodiment, a compensation corrector is further provided, and coupled to the OR gate. The compensation corrector prevents successive shifting/modifying of digital video data of horizontally/vertically/temporally adjacent pixels to the same value otherwise resulting from dynamic companding.

38 Claims, 10 Drawing Sheets

DIGITAL VIDEO DATA QUANTIZATION ERROR DETECTION AS APPLIED TO INTELLIGENT DYNAMIC COMPANDING

BACKGROUND OF THE INVENTION

1. Field of the Invention

The present invention relates to the field of digital video systems. More specifically, the present invention relates to quantization error detection in these digital video systems.

2. Background

In digital video systems, it is common to find digital video data being shifted/modified from one range to another, for example, from 0–255 to 16–235. The digital video data may be shifted/modified for various purposes including but not limited to filtering. In the process of shifting/modifying digital data, rounding errors will occur. In the example of shifting/modifying data from 0–255 to 16–235, the 8-bit output data would be computed from the transfer function Data_out =Truncated (Data_in ×(219/255) +16). A number of numerically adjacent Data_in values will be shifted/modified to the same Data_out values. For examples, Data_out would be 16 for both Data_in=0, and Data_in=1, while Data_out would be 22 for both Data_in=7 and Data_in=8. Very often dynamic companding or rounding will be employed to minimize the impact of rounding errors, a phenomenon which can manifest itself as visual banding. Dynamic companding is a process that varies quantization ranges in order to mask the rounding errors, or visual banding, by rounding up or rounding down based on probability, rather than simply truncating.

However, there is a tradeoff in using dynamic companding to ameliorate the rounding error situation. Random noise is introduced into the video image as a result of rounding up or down based on probability. The additional random noise can reduce the clarity of the image, as an entire frame will have additional noise. Thus, it is desirable if the digital video system would perform dynamic companding on the digital video data only when necessary. Then, the rounding error problem can be ameliorated with minimal compromise to the video quality of the video image.

Particular examples of situations where dynamic companding is "necessary" include the situations where rounding errors of numerically adjacent values occur horizontally and/or vertically adjacent to each other in a frame, i.e. when the numerical adjacent values of two horizontally and/or vertically adjacent pixels in a frame are going to be rounded to the same shifted/modified value by the transfer function. The two situations are illustrated by the exemplary horizontally adjacent XX and vertically adjacent YY values in the exemplary frame in FIG. 10, where X and Y are two arbitrary shifted/modified values.

A further example of another situation where dynamic companding is "necessary" is the situation where rounding errors of numerically adjacent values occur temporally adjacent to each other in two successive frames, i.e. when the numerically adjacent values of two temporally adjacent pixels in two successive frames are going to be rounded to the same shifted/modified value by the transfer function. The situation is illustrated by the exemplary temporally adjacent TT values in the two exemplary successive frames in FIG. 10, where T is also an arbitrary shifted/modified value.

As will be disclosed, the present invention provides a method and apparatus for detecting digital video data quantization errors of numerically adjacent values in spatially and/or temporally adjacent pixels, thereby enabling the above described desirable results to be achieved.

SUMMARY OF THE INVENTION

A method and apparatus for detecting digital video data quantization errors of numerically adjacent values in spatially and/or temporally adjacent pixels is disclosed. The disclosed method and apparatus has particular application to digital video systems for controlling dynamic companding of digital video data such that dynamic companding may be performed with minimal compromise to the video quality of the video image. Under one embodiment of the disclosed method and apparatus, a first and a second similarly constituted detector, and an OR gate coupled to the two detectors, are provided to a digital video system. The first detector detects quantization errors of numerically adjacent values in vertically adjacent pixels of a current frame. The second detector detects quantization errors of numerically adjacent values in horizontally adjacent pixels in the current frame. The OR gate is used to determine whether quantization errors of numerically adjacent values are detected in at least one of the two spatial dimensions of pixel adjacency in the current frame.

The first detector receives synchronized digital video data of current line video and line delayed video of a current frame as inputs. The current line video comprises digital video data of pixels of the current line. The line delayed video comprises digital video data of pixels vertically adjacent to the pixels of the current line. In response, the first detector outputs an enabled vertically and numerically adjacent quantization error detected condition signal ($QE_v$) whenever quantization errors of numerically adjacent values are detected in vertically adjacent pixels of the frame. The second detector receives synchronized digital video data of current line video and pixel delayed video of the current frame as inputs. The pixel delayed video comprises digital video data of pixels horizontally adjacent to pixels of the current line. In response, the second detector outputs an enabled horizontally and numerically adjacent quantization error detected condition signal ($QE_h$) whenever quantization errors of numerically adjacent values are detected in horizontally adjacent pixels in the current frame. The OR gate coupled to the two detectors receives the $QE_v$ and $QE_h$ condition signals as inputs, and in response, outputs an enabled dynamic rounding enable signal (DRE), whenever at least one of the $QE_v$ and $QE_h$ condition signals is enabled.

Each of the similarly constituted detectors comprises an XOR gate, a potential quantization error lookup table, a plurality of incrementor and value equivalency lookup table pairs, a plurality of AND gates corresponding to the incrementor and value equivalency lookup table pairs, and an OR gate. The XOR gate, the potential quantization error lookup table, and the incrementor and value equivalency lookup table pairs, are used to determine whether various necessary conditions for the occurrence of quantization errors of numerically adjacent values in vertically/horizontally adjacent pixels in the current frame exist. The corresponding AND gates and the OR gate are used to determine whether sufficient conditions for the occurrence of quantization errors of numerically adjacent values in vertically/horizontally adjacent pixels of the current frame exist.

More specifically, the XOR gate is used to determine whether the digital video data of the two synchronized lines of video of the current frame being compared have identical vertical/horizontal pixel values. The potential quantization error lookup table is used to determine whether the digital video data of the vertically/horizontally adjacent pixels of the current frame are among the data_in values of a particular data shifting/modifying function that will cause quantization errors. The potential quantization error lookup table comprises a list of data_in values of a particular data shifting/modifying function that will cause quantization errors. The incrementor and value equivalency table pairs are used to determine whether the digital video data of vertically/horizontally adjacent pixels of the current frame are numerically adjacent.

In one variation of this embodiment, a potential quantization error lookup table that supports concurrent lookups for vertically and numerically adjacent quantization error detection as well as horizontally and numerically adjacent quantization error detection is used and shared between the two detectors.

In an expanded embodiment, a third similarly constituted detector is further provided to the digital video system. The OR gate coupled to the first and second detector is also coupled to this third detector. The third detector detects quantization errors of numerically adjacent values in temporally adjacent pixels of successive frames. The OR gate is used to determine whether quantization errors of numerically adjacent values are detected in at least one of the three dimensions of pixel adjacency, i.e. the two spatial dimensions of pixel adjacency of the current frame and the temporal dimension of pixel adjacency of successive frames.

The third detector receives synchronized digital video data of current line video and frame delayed video of successive frames as inputs. The frame delayed video comprises digital video data of pixels temporally adjacent to the pixels of the current line. In response, the third detector outputs an enabled temporally and numerically adjacent quantization error detected condition signal ($QE_t$) whenever quantization errors of numerically adjacent values are detected in temporally adjacent pixels of successive frames. The OR gate coupled to the three detectors receives the $QE_v$, $QE_h$ and $QE_t$ condition signals as inputs, and in response, outputs an enabled dynamic rounding enable signal (DRE), whenever at least one of the $QE_v$, $QE_h$ and $QE_t$ condition signals is enabled.

In a further expanded embodiment, a compensation corrector is further provided to the digital video system. The compensation corrector is coupled to the OR gate coupled to the three detectors. The compensation corrector prevents successive shifting/modifying of digital video data of horizontally/vertically/temporally adjacent pixels to the same dynamic companding value. If the DRE signal is enabled, the compensation corrector determines whether the compensated DRE signal (DRE') was enabled for at least one of the immediately preceding pixels in the vertical, horizontal, and temporal dimensions of adjacency. For each of the cases where the DRE' signal of the immediately preceding pixel of a particular dimension of adjacency was enabled, the compensation corrector further determines whether the current dynamic companding value (DCV) is the same as the DCV of the immediately preceding pixel in that dimension of adjacency. If the current DCV is the same as the DCV of the immediately preceding pixel in at least one dimension of adjacency where the DRE' signal of the immediately preceding pixel of the particular dimension of adjacency was enabled, the compensation corrector disables the enabled DRE signal, i.e. DRE'=disable.

The compensation corrector receives the DRE signal, the current DCV if the DRE signal is enabled, the DRE' signals and DCVs of the immediately preceding pixels of the vertical, horizontal, and temporal dimension of adjacency as inputs. In response, the compensation corrector outputs the DRE' signal. In one embodiment, the compensation corrector comprises a plurality of AND gates and a NOR gate which are used collectively to make the above described determinations based on the above described inputs.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION PRESENTLY PREFERRED AND ALTERNATE EMBODIMENTS

A method and apparatus for detecting digital video data quantization errors of numerically adjacent values in spatially and/or temporally adjacent pixels is disclosed. The disclosed method and apparatus has particular application to digital video systems for controlling dynamic companding of digital video data such that dynamic companding may be performed without compromising the quality of the video image. While for ease of understanding, the present invention will be described in the context of its application to dynamic companding, it will be appreciated that the present invention may be applied to other digital video applications requiring adjacent pixel value comparisons and generating a condition signal depending on the results of the comparisons. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
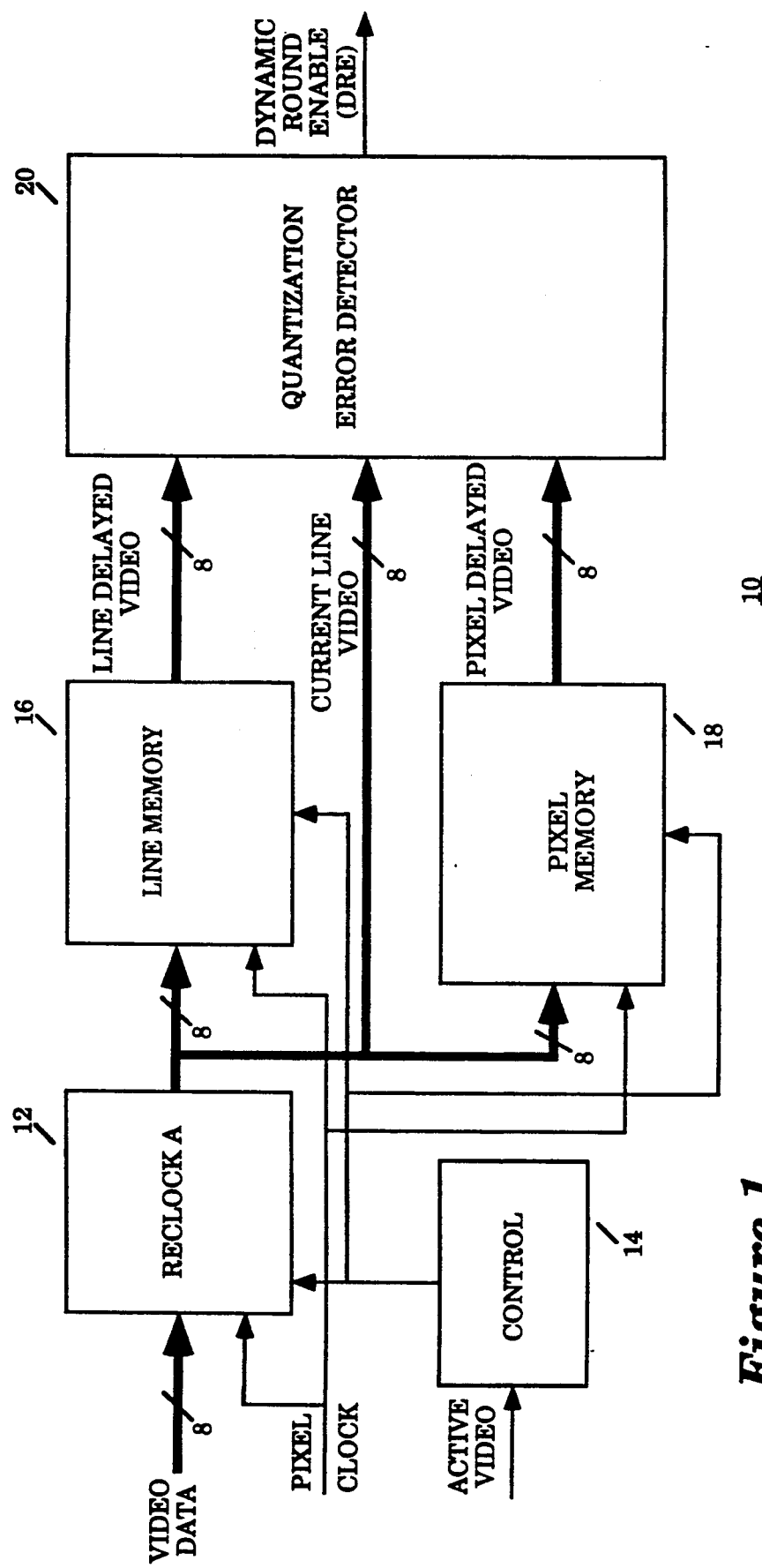
FIG. 1 illustrates the operating environment of one embodiment of the present invention.

Referring now to FIG. 1, a block diagram illustrating the operating environment of one embodiment of the present invention is shown. Shown is one embodiment of the quantization error detector 20 of the present invention coupled to a line memory 16, a pixel memory 18, and a reclock unit 12. This embodiment of the quantization error detector 20 of the present invention receives digital video data of the current line video, the line delayed video, and the pixel delayed video, from the line memory 16, the reclock unit 12, and the pixel memory 18 respectively as inputs. The current line video comprises digital video data of pixels of the current line. The line delayed video comprises digital video data of pixels vertically adjacent to the pixels of the current line, whereas the pixel delayed video comprises digital video data of pixels horizontally adjacent to the pixels of the current line. In response, the quantization error detector 20 outputs an enabled dynamic round enable signal (DRE) if it detects a quantization error of numerically adjacent digital video data values in at least one of two dimensions of pixel adjacency, i.e. the vertical and horizontal dimensions of pixel adjacency.

Also shown are the line memory 16, the reclock unit 12, and the pixel memory 18 receiving pixel clock input, and control signals from a controller 14. The line memory 16, the reclock unit 12, the pixel memory 18, and the controller 14 are intended to represent a broad category of these elements found in many digital video systems. Their constitution and basic functions are well known and will not be further described here. This embodiment of quantization error detector 20 of the present invention will be described in further detail below with additional references to FIGS. 2–4.

While the present invention is being described with an embodiment outputting an enabled DRE signal if it detects a quantization error of numerically adjacent digital video data values in at least one of two dimensions of pixel adjacency, i.e. the vertical and horizontal dimensions of pixel adjacency, based on the descriptions to follow, it will be appreciated that the present invention may be practiced with one or more dimensions of pixel adjacency.

Figure 2:
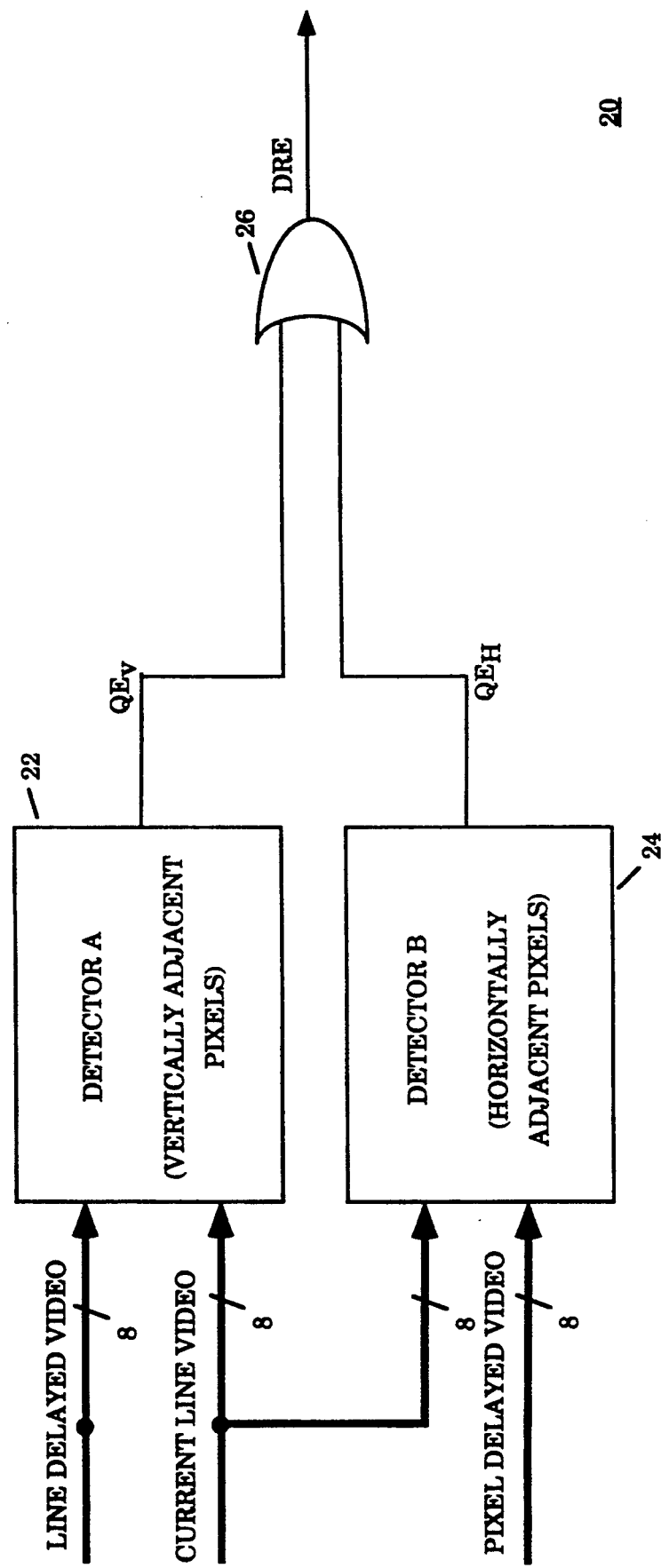
FIG. 2 illustrates the major function blocks of the embodiment of FIG. 1.

Referring now to FIG. 2, a diagram illustrating the functional blocks of the embodiment of FIG. 1 is shown. This embodiment of quantization error detector 20 of the present invention comprises a first and a second similarly constituted detector, 22 and 24. Both detectors 22 and 24 are coupled to the OR gate 26. The first detector 22 detects quantization errors of numerically adjacent values in vertically adjacent pixels of a current frame. The second detector 24 detects quantization errors of numerically adjacent values in horizontally adjacent pixels in the current frame. The OR gate 26 is used to determine whether quantization errors of numerically adjacent values are detected in at least one of the two spatial dimensions of pixel adjacency in the current frame.

The first detector 22 receives as inputs synchronized digital video data of the pixels of the current line and the pixels vertically adjacent to the pixels of the current line, that is, the current line video and the line delayed video of a current frame. In response, the first detector 22 outputs an enabled vertically and numerically adjacent quantization error detected condition signal ($QE_v$) whenever quantization errors of numerically adjacent values are detected in vertically adjacent pixels of the frame. The second detector 24 receives as inputs synchronized digital video data of the pixels of the current line and the pixels horizontally adjacent to the pixels of the current line, that is, the current line video and the pixel delayed video of the current frame. In response, the second detector 24 outputs an enabled horizontally and numerically adjacent quantization error detected condition signal ($QE_h$) whenever quantization errors of numerically adjacent values are detected in horizontally adjacent pixels in the current frame. The OR gate 26 coupled to the two detectors receives the $QE_v$ and $QE_h$ condition signals as inputs, and in response, outputs an enabled DRE signal, whenever at least one of the $QE_v$ and $QE_h$ condition signals is enabled.

Figure 3:
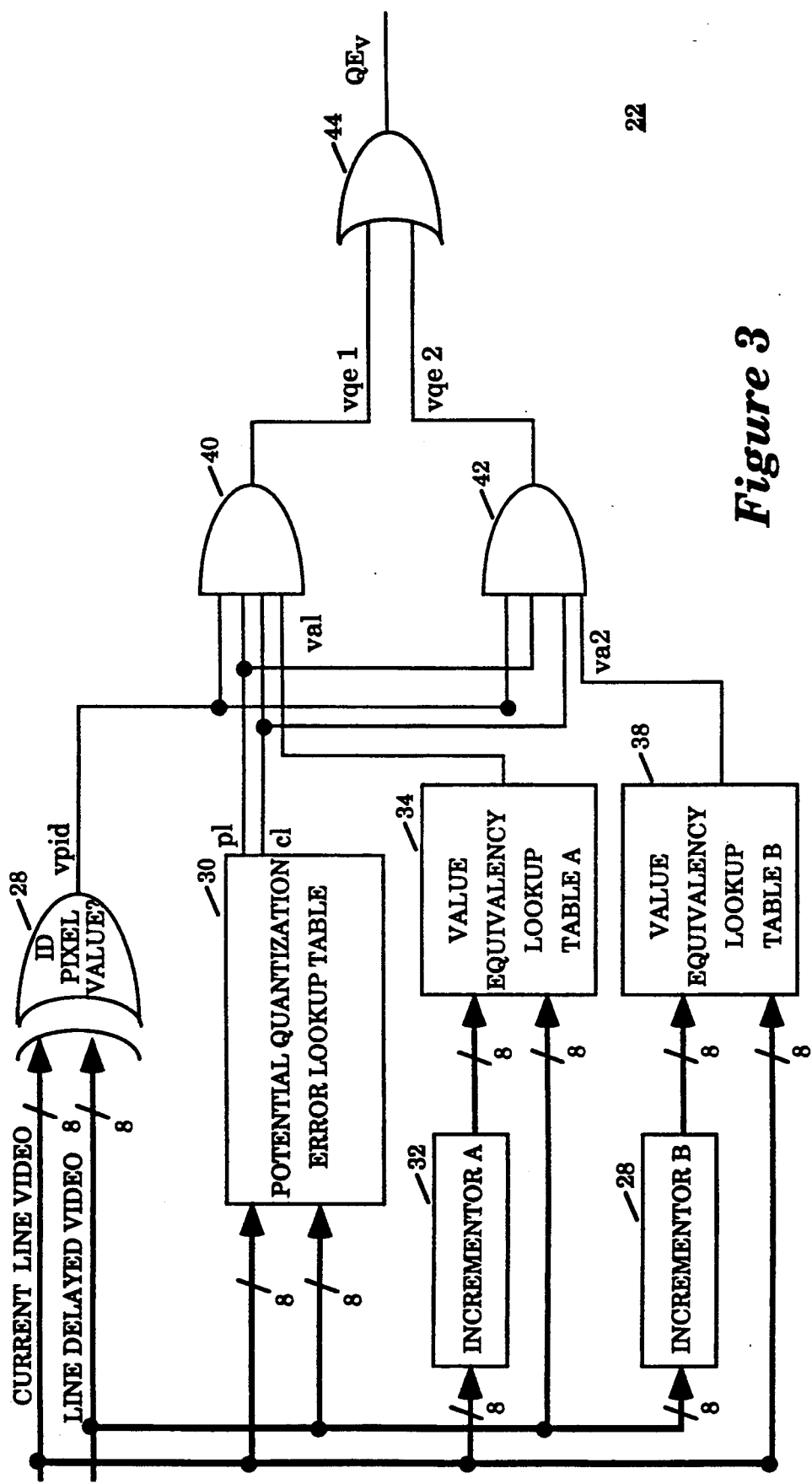
FIG. 3 illustrates one embodiment of the detector of FIG. 2 for vertically adjacent pixels in further detail.
Figure 4:
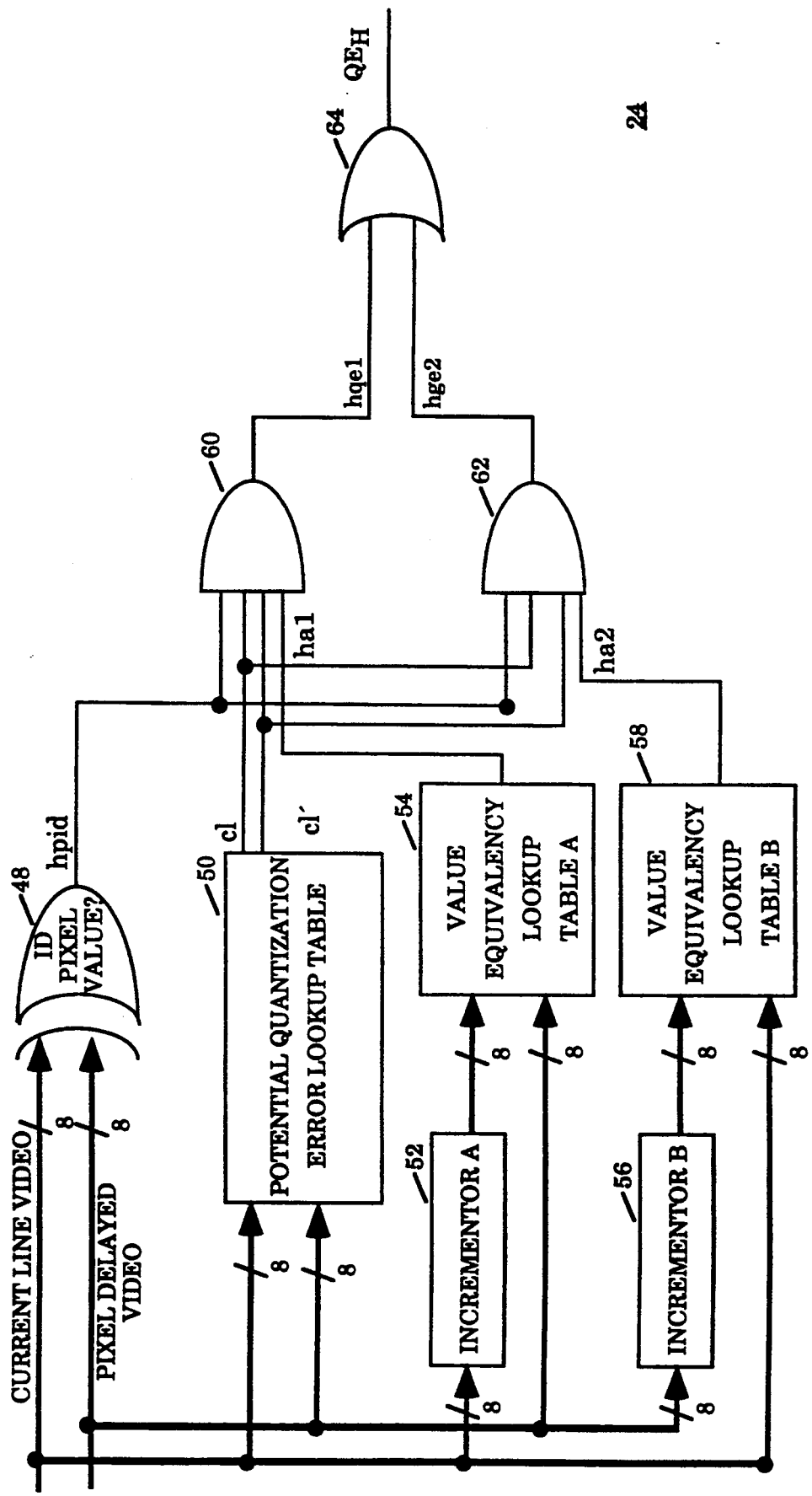
FIG. 4 illustrates one embodiment of the detector of FIG. 2 for horizontally adjacent pixels in further detail.

Referring now to FIGS. 3–4, two block diagrams illustrating one embodiment of the two similarly constituted detectors of FIG. 2 in further detail is shown. Each of the similarly constituted detectors comprises an XOR gate, 28 or 48, a potential quantization error lookup table, 30 or 50, a plurality of incrementor and value equivalency lookup table pairs, 32-38, or 52-58, a plurality of AND gates, 40, 42, or 60, 62, corresponding to the incrementor and value equivalency lookup table pairs, 32-38 or 52-58, and an OR gate 44 or 64. The XOR gate, 28 or 48, the potential quantization error lookup table, 30 or 50, and the incrementor and value equivalency lookup table pairs, 32-38, or 52-58, are used to determine whether various necessary conditions for the occurrence of quantization errors of numerically adjacent values in vertically/horizontally adjacent pixels in the current frame exist. The corresponding AND gates, 40-42 or 60-62, and the OR gate, 44 or 64, are used to determine whether sufficient conditions for the occurrence of quantization errors of numerically adjacent values in vertically/horizontally adjacent pixels of the current frame exist.

More specifically, the XOR gate, 28 or 48, is used to determine whether the digital video data of the two synchronized lines of video of the current frame being compared have identical vertical/horizontal pixel values. The XOR gate, 28 or 48, receives as inputs the synchronized digital video data of the pixels of the current line, and the pixels vertically adjacent to the pixels of the current line, that is, the current line video and the line delayed video, or the synchronized digital video data of the pixels of the current line and the pixels horizontally adjacent to the pixels of the current line, that is, the current line video and the pixel delayed video. In response, the XOR gate, 28 or 48, outputs a logic one for an identity condition signal (vpid or hpid) if the vertical/horizontal pixel values are not identical.

The potential quantization error lookup table, 30 or 50, is used to determine whether the digital video data of the vertically/horizontally adjacent pixels of the current frame are among the data_in values of a particular data shifting/modifying function that will cause quantization errors. The potential quantization error lookup table, 30 or 50, comprises a list of data_in values of a particular data shifting/modifying function that will cause quantization errors. The potential quantization error lookup table, 30 or 50, receives as inputs synchronized digital video data of the pixels of the current line and the pixels vertically adjacent to the pixels of the current line, that is, the current line video and the line delayed video, or synchronized digital video data of the pixels of the current line and the pixels horizontally adjacent to pixels of the current line, that is, the current line video and the pixel delayed video. In response, the potential quantization error lookup table 30 or 50, outputs two logic ones for two potential quantization error condition signals (cl and pl, or cl and cl') if the digital video data values of the vertically adjacent pixels or horizontally adjacent pixels are among the data_in values stored in the lookup table, 30 or 50.

It will be appreciated that for different types or different ranges of data shifting/modifying functions, different lists of data_in values will have to be stored in the potential quantization error lookup tables, 30 and 50, of the two detectors, 22 and 24. For example, for the above described exemplary transfer function, shifting-/modifying digital video data from 0 –255 to 16–235, the potential quantization error lookup tables, 30 and 50, are loaded with the data_in values of 0, 1, 7, 8, etc., since both data_in values 0 and 1 are being shifted/-modified to the data_out value 16, both data_in values of 7 and 8 are being shifted/modified to the data_out value 22, etc. It will be further appreciated that, with additional control, data_in values that cause quantization errors for multiple shifting/modifying functions may be stored in the potential quantization error lookup tables, 30 and 50, of the two detectors, 22 and 24.

The incrementor and value equivalency table pairs, 32-38, or 52-58, are used to determine whether the digital video data of vertically/horizontally adjacent pixels of the current frame are numerically adjacent. In this embodiment, two incrementor and value equivalency table pairs, 32-38 or 52-58, are provided for each of the similarly constituted detectors, 22 or 24. The first incrementor and value equivalency table pair, 32-34, or 52-54, is used to determine numerical adjacency for the case where the digital video data of a pixel of the current line is smaller than the digital video data of the pixel vertically adjacent to the pixel of the current line, or the digital video data of a pixel of the current line is smaller than the digital video data of the pixel horizontally adjacent to the pixel of the current line. For example, when the data_in values of a pixel of the current line and the pixel vertically/horizontally adjacent to the pixel of the current line are 7 and 8 respectively. The second incrementor and value equivalency table pair, 36-38, or 56-58, is used to determine numerical adjacency for the case where the digital video data of a pixel of the current line is greater than the digital video data of the pixel vertically adjacent to the pixel of the current line, or the digital video data of a pixel of the current line is greater than the digital video data of the pixel horizontally adjacent to the pixel of the current line. For example, when the data_in values of a pixel of the current line and the pixel vertically/horizontally adjacent to the pixel of the current line are 8 and 7 respectively.

The first incrementor, 32 or 52, receives the digital video data of the pixel of the current line as input. In response, the first incrementor, 32 or 52, outputs the input digital video data with incremented values. The second incrementor, 36 or 56, receives the digital video data of pixels vertically adjacent to the pixels of the current line or the digital video data of pixels horizontally adjacent to the pixels of the current line as input. In response, the second incrementor, 36 or 56, also outputs the input digital video data with incremented values. In this embodiment, both incrementors, 32 and 36, and 52 and 56, of both detectors, 22 and 24, increment the input digital video data by one.

The first value equivalency lookup table, 34 or 54, receives the incremented digital video data of the pixels of the current line, and the digital video data of the pixels vertically/horizontally adjacent to the pixels of the current line as inputs. In response, the first value equivalency lookup table, 34 or 54, outputs an enabled first vertical or horizontal numerical adjacency condition signal (va1 or ha1) if the inputting values are equal. Similarly, the second value equivalency lookup table, 38 or 58, receives the incremented digital video data of the pixels vertically/horizontally adjacent to the pixels of the current line, and the digital video data of the pixels of the current line as inputs. In response, the second value equivalency lookup table, 38 or 58, outputs an enabled second vertical or horizontal numerical adjacency condition signal (va2 or ha2) if the inputting values are equal.

It will be appreciated that the number of incrementor and value equivalency lookup table pairs, 32-38, and 52-58, required for a detector and the amount incremented by each incrementor, 32, 36, 52 or 56, are dependent on the particular type or range of video data shifting/modifying function being supported. The embodiment illustrated will support video data shifting-/modifying functions where two numerically adjacent data_in values are shifted/modified to the same data_out value. For example, the type of video data shifting-/modifying function illustrated by the above described example, i.e. shifting/modifying digital video data from 0–255 to 16–235. For different types or ranges of digital video data shifting/modifying functions, different number of incrementor and value equivalency lookup table pairs may have to be provided. Additionally, different amounts of increment may also have to be used for some of the incrementors. For example, for a particular digital video data shifting/modifying function where three numerically adjacent data_in values are shifted/modified to the same data_out value, such as 6, 7, and 8 all being shifted/modified to the same data-out value, six incrementor and value equivalency lookup table pairs will have to be provided to cover all six cases of numerical adjacency, i.e. 6 and 7, 6 and 8, 7 and 6, 7 and 8, 8 and 6, and, 8 and 7. Additionally, two of the incrementors will have to increment the input value by 2, i.e. the incrementors that cover the cases of 6 and 8, and 8 and 6.

Furthermore, it will be appreciated that while determination of numerical adjacency has been described using incrementor and value equivalency lookup table pairs, numerical adjacency may be determined with other circuitry providing equivalent functions.

Still referring to FIGS. 3 and 4, the first corresponding AND gate, 40 or 60, receives the vpid, cl, pl and va1 condition signals or the hpid, cl, cl' and ha1 condition signals as inputs, and in response, outputs a logic one for a condition signal (vqe1 or hqe1) indicating quantization error detected in the vertical or horizontal dimension of pixel adjacency. Similarly, the second corresponding AND gate, 42 or 62, receives the vpid, cl, pl and va2 condition signals or the hpid, cl, cl' and ha2 condition signals as inputs, and in response, outputs a logic one for a condition signal (vqe2 or hqe2) indicating also quantization error detected in the vertical or horizontal dimension of pixel adjacency. The OR gate, 44 or 64, receives either the vqe1 and vqe2 condition signals, or the hqe1 and hqe2 condition signals, as inputs, and in response, outputs the $QE_v$ or the $QE_h$ condition signal.

It will be appreciated that if additional incrementor and value equivalency lookup table pairs are provided, a corresponding AND gate having similar inputs and output as the illustrated AND gates, 40-42 and 60-62, has to be provided for each additional incrementor and value equivalency lookup table pair.

Still referring to FIGS. 3 and 4, in one variation of this embodiment, a potential quantization error lookup table that supports concurrent lookups for vertically and numerically adjacent quantization error detection as well as horizontally and numerically adjacent quantization error detection is used and shared between the two detectors. The shared potential quantization error lookup table receives as inputs the digital video data of the pixels of the current line video, the digital video data of the pixels vertically adjacent to the pixels of the current line, and the digital video data of the pixels horizontally adjacent to the pixels of the current line, that is, the current line video, the line delayed video, and the pixel delayed line video. In response, the shared potential quantization error lookup table outputs enabled cl, pl and cl' condition signals if the input values are among the list of data_in values stored in the lookup table.

Figure 5:
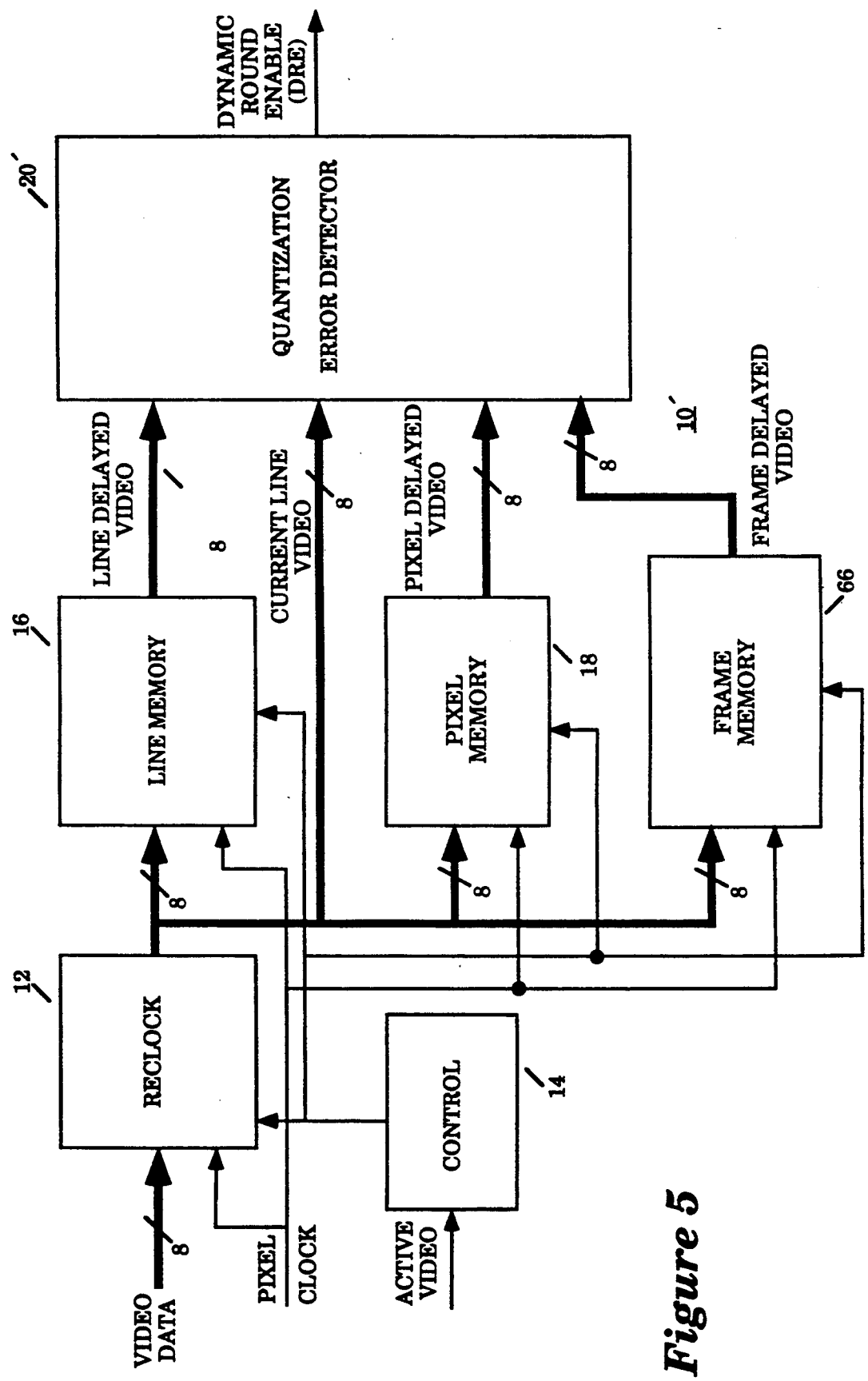
FIG. 5 illustrates the operating environment of an expanded embodiment of the present invention.

Referring now to FIG. 5, a block diagram illustrating the operating environment of an expanded embodiment of the quantization error detector of the preset invention is shown. Additionally shown is the frame memory 66 providing frame delayed video to the expanded embodiment of quantization error detector 20'. Similar to the line memory 16 and pixel memory 18, the frame memory 66 is coupled to the reclock unit 12, the pixel clock and the control circuitry 14, receiving reclocked video data, pixel clock pulses and control signals from these units. The frame memory 66 is also intended to represent a broad category of memory found in most digital video systems, its constitution and basic functions are well known, and will not be further described.

Figure 6:
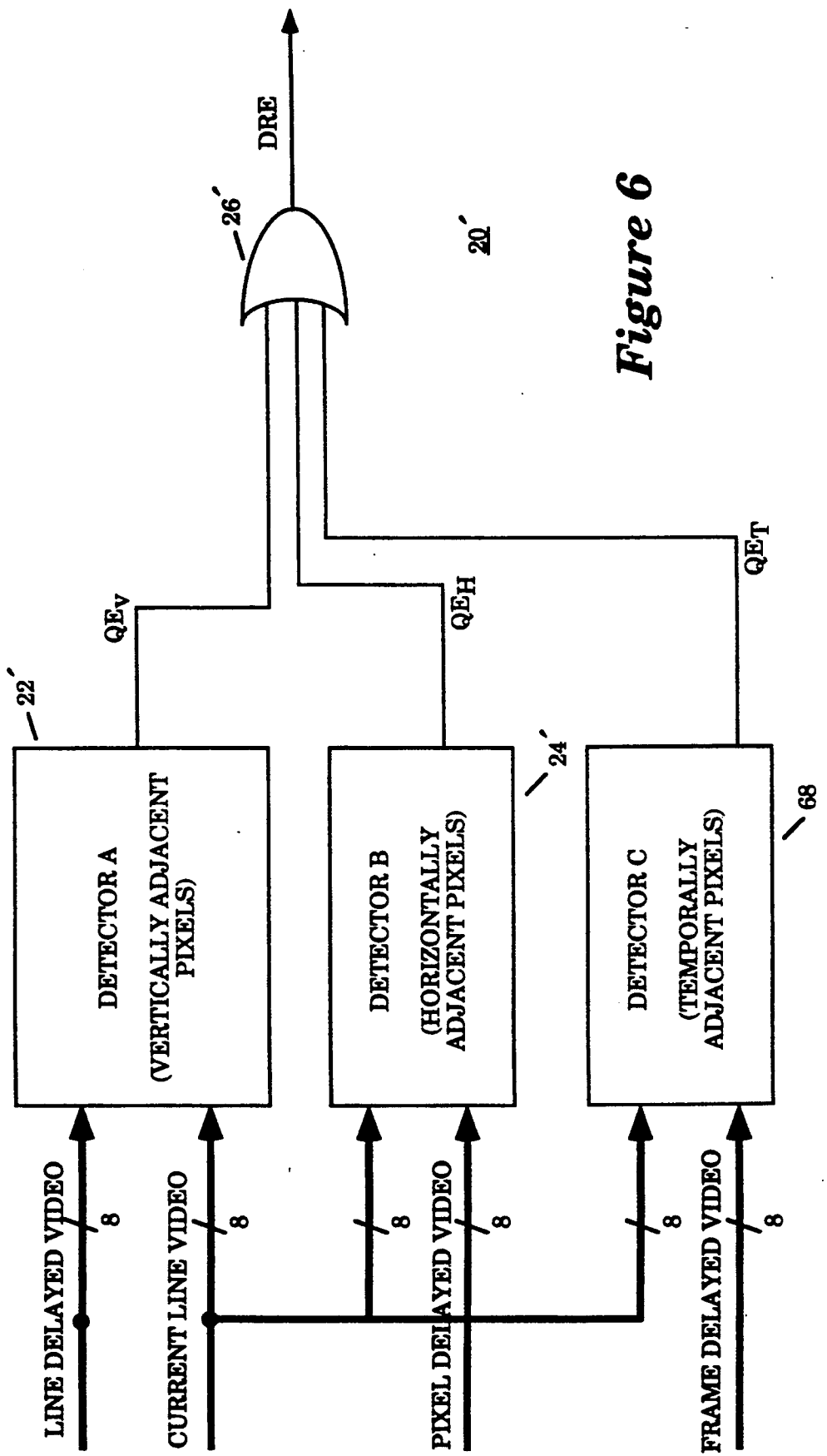
FIG. 6 illustrates the major function blocks of the expanded embodiment of FIG. 5.

Referring now to FIG. 6, a block diagram illustrating the functional blocks of the expanded embodiment of FIG. 5 is shown. Additionally shown is a third detector 68, similarly constituted as the first and second detectors, 22' and 24', for detecting quantization error of numerically adjacent values in temporally adjacent pixels. The OR gate 26' is coupled to all three detectors, 22', 24' and 68. The first and second detectors, 22' and 24', provide the same functions as described earlier. The OR gate 26' is used to determine whether quantization errors of numerically adjacent values are detected in at least one of the three dimensions of pixel adjacency, i.e. the two spatial dimensions of pixel adjacency of the current frame and the temporal dimension of pixel adjacency of successive frames.

The first and second detectors, 22' and 24', for the vertical and horizontal dimension of pixel adjacency, receive the same inputs and output the same enabled $QE_v$ and $QE_h$ condition signals as described earlier. The third detector 68 receives synchronized digital video data of current line video and frame delayed video of successive frames as inputs. The frame delayed video comprises digital video data of pixels temporally adjacent to the pixels of the current line. In response, the third detector 68 outputs an enabled temporally and numerically adjacent quantization error detected condition signal ($QE_t$) whenever quantization errors of numerically adjacent values are detected in temporal adjacent pixels of successive frames. The OR gate 26' coupled to the three detectors, 22', 24', and 68, receives the $QE_v$, $QE_h$ and $QE_t$ condition signals as inputs, and in response, outputs an enabled dynamic rounding enable signal (DRE), whenever at least one of the $QE_v$, $QE_h$ and $QE_t$ condition signals is enabled.

Figure 7:
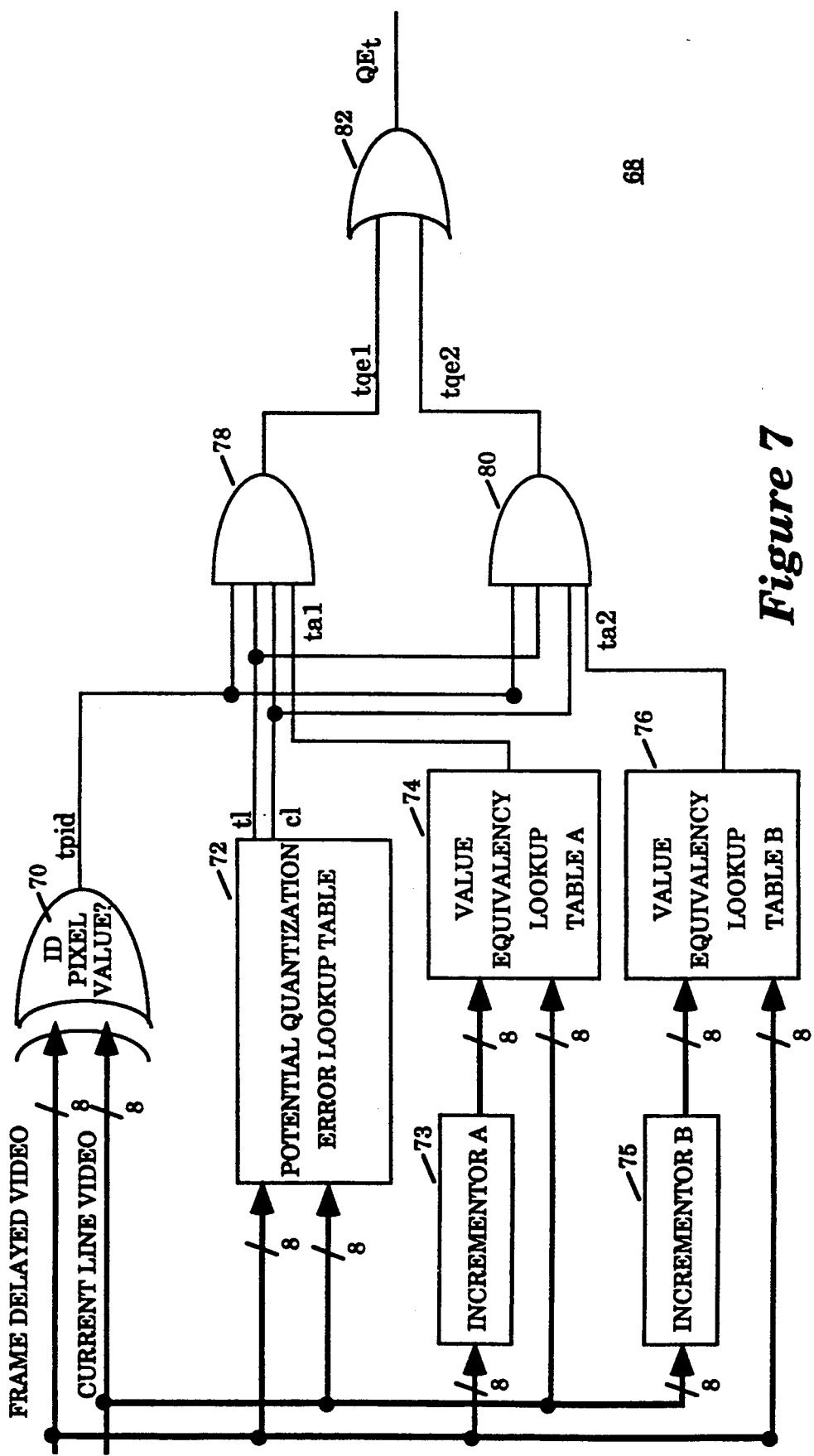
FIG. 7 illustrates one embodiment of the detector of FIG. 6 for temporally adjacent pixels in further detail.

Referring now to FIG. 7, a block diagram illustrating the third detector of FIG. 6 for temporally adjacent pixels in further detail is shown. Similar to the first and second detectors, the third detector 68 comprises an XOR gate 70, a potential quantization error lookup table 72, a plurality of incrementor and value equivalency lookup table pairs, 73-74, and 75-76, a plurality of AND gates, 78 and 80, corresponding to the incrementor and value equivalency lookup table pairs, 73-74, and 75-76, and an OR gate 82. Except for the fact that these elements, 70-82, work with the current line video and frame delayed video, these elements, 70-82, output logic one for condition signals (tpid, cl, tl, ta1, ta2, tqe1, tqe2), and enabled $QE_t$ condition signal, in the same manner as described earlier for the first and second detectors.

Figure 8:
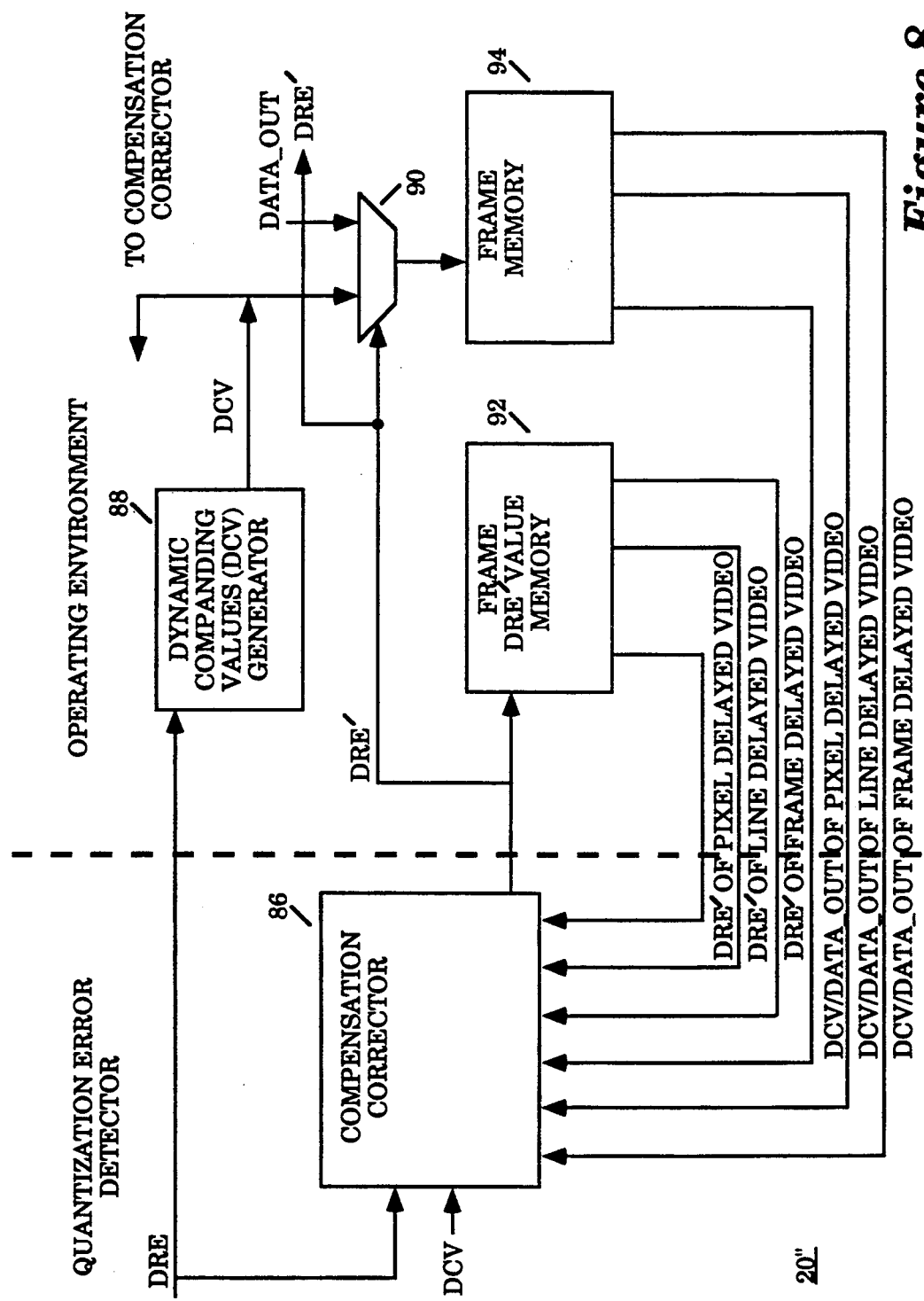
FIG. 8 illustrates the additional elements of a further expanded embodiment of the present invention and the additional elements of its operating environment.

Referring now to FIG. 8, a block diagram illustrating the additional elements of a further expanded embodiment of the quantization error detector of the present invention, and the additional elements of its operating environment is shown. Shown in the further expanded embodiment of the quantization error detector 20" is a compensation corrector 86 for preventing successive shifting/modifying of digital video data of horizontally/vertically/temporally adjacent pixels to the same dynamically companded value. Shown in the operating environment is a dynamic companding value (DCV) generator 88 for generating DCVs, a selector 90 for selecting generated DCVs and data_out values, a first frame memory 92 for storing compensated DRE (DRE') condition signal values, and a second frame memory 94 for storing data_out values with dynamic companding selectively applied. The DCV generator 88 provides DCVs to the compensation corrector 86. The first frame memory 92 provides the DRE' values of the pixel delayed video, the line delayed video, and the frame delayed video to the compensation corrector 86. The second frame memory 94 provides selectively dynamic companded data_out values of the pixel delayed video, the line delayed video, and the frame delayed video to the compensation detector 86.

The DCV generator 88 receives the pre-compensation DRE condition signal as input, and in response, outputs a DCV if the DRE signal is enabled. The first frame memory 92 receives the DRE' values, and various clock and control signals (not shown) as inputs, and in response, outputs the DRE' condition signal values of the pixel delayed video, line delayed video and the frame delayed video. The second frame memory 94 receives the selectively dynamic companded data_out values (DCV/data_out), and various clock and control signals (not shown) as inputs, and in response, outputs the selectively dynamic companded data_out values of the pixel delayed video, the line delayed video and the frame delayed video. Both the first and second frame memory, 92 and 94, are intended to represent a broad category of memory found in most digital video system, whose constitutions and basic functions are well known, and will not be further described.

The compensation corrector 86 receives the uncompensated DRE condition signal, the DCVs, the DRE' values of the various delayed video, and the DCV/data_out of the various delayed video as inputs, and in response, it outputs the DRE' condition signal. The DRE' condition signal is basically the same as the DRE condition signal, except enabled pulses are overridden, i.e. reverted to disable, under certain conditions. The conditions are:

(1) the DRE condition signal is enabled for the current pixel, and (2) the DRE' value of the adjacent pixel is also enabled in at least one of the three dimensions of pixel adjacency, and (3) the DCV of the adjacent pixel is the same as the DCV of the current pixel for at least one of the case where the DRE' value of the adjacent pixel is also enabled.

Figure 9:
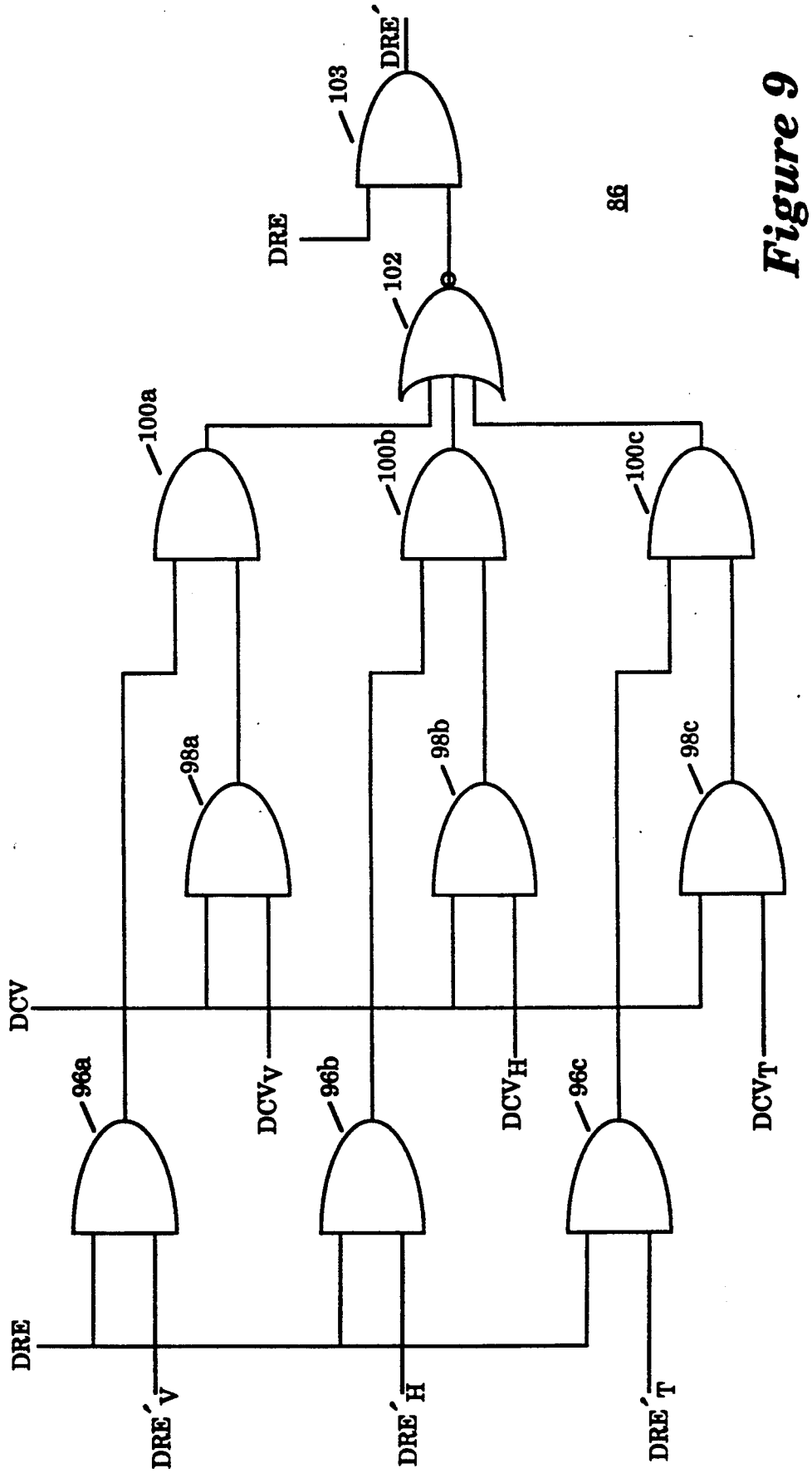
FIG. 9 illustrates one embodiment of the compensation corrector of FIG. 7.
Figure 10:
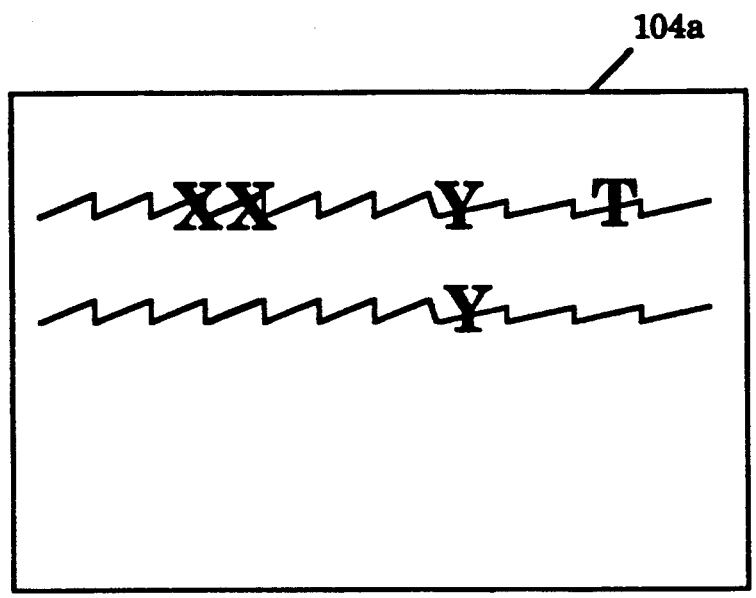
FIG. 10 illustrates horizontal, vertical and temporal adjacency.
Figure 10:
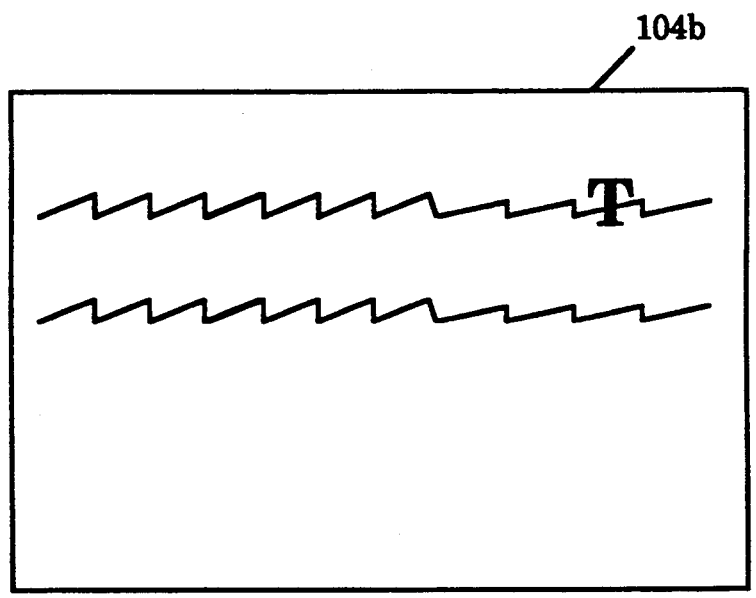

One embodiment of the compensation corrector 86 using a plurality of AND gates and a NOR gate to make these condition determinations and conditionally override an enabled pulse of the DRE condition signal is illustrated in FIG. 9. It will be appreciated that the compensation corrector 86 may be implemented with a wide variety of equivalent circuitry.

While the present invention has been described in terms of presently preferred and alternate embodiments, and in terms of its application to dynamic companding, those skilled in the art will recognize that the invention is not limited to the embodiments nor the application described. The method and apparatus of the present invention can be practiced with modification and alteration to the embodiments and its application within the spirit and scope of the appended claims. The description is thus to be regarded as illustrative instead of limiting on the present invention.

What is claimed is:

1. In a digital video system comprising a plurality of digitized lines of video, an apparatus for detecting quantization errors of numerically adjacent values of digital video data of adjacent pixels in a dimension of pixel adjacency, said apparatus comprising:

a) first condition determination means for determining whether digital video data of a first and a second line of video have identical pixel values, said first and second lines of video being synchronized in said dimension of pixel adjacency;

b) second condition determination means for determining whether corresponding digital video data of said first and second lines of video are members of a list of input values (data_in) of a digital video data shifting/modifying function that cause quantization errors;

c) third condition determination means for determining whether corresponding digital video data of said first and second lines of video are numerically adjacent to each other; and d) fourth condition determination means coupled to said first, second and third condition determination means for determining if quantization errors of numerically adjacent values exist for corresponding digital video data of said first and second lines of video based on the determination results of said first, second and third condition determination means.

2. The apparatus as set forth in claim 1, wherein, said first condition determination means receives said first and second lines of video, determines whether digital video data of said first and second lines of video have identical pixel values, and outputs a logic one for a first condition signal (pid) if said digital video data of said first and second lines of video are determined as having different pixel values;

said second condition determination means receives said first and second lines of video, determines whether corresponding digital video data of said first and second lines of video are members of said list of data$_{13}$in values of said digital video data shifting/modifying function that cause quantization errors, and outputs a logic one for a second condition signal (l1 ) and a logic one for a third condition signal (l2) if said corresponding digital video data of said first and second lines of video are determined to be members of said list respectively;

said third condition determination means receives said first and second lines of video, determines whether corresponding digital video data of said first and second lines of video are numerically adjacent to each other, and outputs a logic one for a fourth and a fifth condition signal (n1 and n2) if said corresponding digital video data of said first and second lines of video are determined to be numerically adjacent to each other;

said fourth condition determination means receives said pid, l1, l2, n1 and n2 condition signals, determines if all condition signals comprise logic ones in at least one combination of said pid, l1, l2 condition signals and a selected one of said n1 and n2 condition signals, and outputs a logic one for a sixth condition signal (QE) if all condition signals are determined to comprise logic ones for at least one combination of said pid, l1, l2 condition signals and a selected one of said n1 and n2 condition signals, indicating a quantization error of numerically adjacent values is detected for adjacent pixels in said dimension of pixel adjacency.

3. The apparatus as set forth in claim 2, wherein, said first condition determination means comprise an XOR gate receiving said first and second lines of video, and outputting a logic one for said pid condition signal if said digital video data of said first and second lines of video have different pixel values;

said second condition determination means comprises a potential quantization error lookup table storing said list of data_in values of said digital video data shifting/modifying function that cause quantization errors receiving said first and second lines of video, and outputting a logic one for said l1 condition signal and a logic one for said l2 condition signal if said corresponding digital video data of said first and second lines of video are members of said list stored in said lookup table respectively;

said third condition determination means comprises an assembly of a first and a second incrementor and value equivalency lookup table pair receiving said first and second lines of video, said first incrementor and value equivalency lookup table pair outputting a logic one for said n1 condition signal if digital video data of said first line of video incremented by the incrementor of said first pair equals corresponding digital video data of said second line of video in accordance to said value equivalency lookup table of said first pair, said second incrementor and value equivalency lookup table pair outputting a logic one for said n2 condition signal if digital video data of said second line of video incremented by the incrementor of said second pair equals corresponding digital video data of said second line of video in accordance to the value equivalency table of said second pair;

said fourth condition determination means comprises an assembly of a first AND gate coupled to said XOR gate, said potential quantization error lookup table, and said first incrementor and value equivalency lookup table pair receiving said pid, l1, l2 and n1 condition signals, a second AND gate coupled to said XOR gate, said potential quantization error lookup table, and said second incrementor and value equivalency lookup table pair receiving said pid, l1, l2 and n2 condition signals, and an OR gate coupled to said first and second AND gates, said first AND gate outputting a logic one for a seventh condition signal (qe1) if said pid, l1, l2, and n1 condition signals comprise all logic ones, said second AND gate outputting a logic one for an eighth condition signal (qe2) if said pid, l1, l2, and n2 condition signals comprise all logic ones, said OR gate receiving said qe1 and qe2 condition signals and outputting a logic one for said QE condition signal if at least one of said qe1 and qe2 condition signal comprises a logic one.

4. The apparatus as set forth in claim 1, wherein, said dimension of pixel adjacency is a vertical dimension of pixel adjacency, said first condition determination means determines whether digital video data of a current line and a line delayed video have identical pixel values, said current line and line delayed video being synchronized in said vertical dimension of pixel adjacency;

said second condition determination means determines whether corresponding digital video data of said current line and line delayed video are members of said list of data_in values of said digital video data shifting/modifying function that cause quantization errors;

said third condition determination means determines whether corresponding digital video data of said current line and line delayed video are numerically adjacent to each other; and said fourth condition determination means determines if quantization errors of numerically adjacent values exist for corresponding digital video data of said current line and line delayed video based on the determination results of said first, second and third condition determination means.

5. The apparatus as set forth in claim 1, wherein, said dimension of pixel adjacency is a horizontal dimension of pixel adjacency, said first condition determination means determines whether digital video data of a current line and a pixel delayed video have identical pixel values, said current line and pixel delayed video being synchronized in said horizontal dimension of pixel adjacency;

said second condition determination means determines whether corresponding digital video data of said current line and pixel delayed video are members of said list of data_in values of said digital video data shifting/modifying function that cause quantization errors;

said third condition determination means determines whether corresponding digital video data of said current line and pixel delayed video are numerically adjacent to each other; and said fourth condition determination means determines if quantization errors of numerically adjacent values exist for corresponding digital video data of said current line and pixel delayed video based on the determination results of said first, second and third condition determination means.

6. The apparatus as set forth in claim 1, wherein, said dimension of pixel adjacency is a temporal dimension of pixel adjacency, said first condition determination means determines whether digital video data of a current line and a frame delayed video have identical pixel values, said current line and frame delayed video being synchronized in said temporal dimension of pixel adjacency;

said second condition determination means determines whether corresponding digital video data of said current line and frame delayed video are members of said list of data_in values of said digital video data shifting/modifying function that cause quantization errors;

said third condition determination means determines whether corresponding digital video data of said current line and frame delayed video are numerically adjacent to each other; and said fourth condition determination means determines if quantization errors of numerically adjacent values exist for corresponding digital video data of said current line and frame delayed video based on the determination results of said first, second and third condition determination means.

7. In a digital video system comprising a plurality of digitized lines of video, a method for detecting quantization errors of numerically adjacent values of digital video data of adjacent pixels in a dimension of pixel adjacency, said method comprising the steps of:

a) determining whether digital video data of a first and a second line of video have identical pixel values, said first and second lines of video being synchronized in said dimension of pixel adjacency;

b) determining whether corresponding digital video data of said first and second lines of video are members of a list of input values (data_in) of a digital video data shifting/modifying function that cause quantization errors;

c) determining whether corresponding digital video data of said first and second lines of video are numerically adjacent to each other; and d) determining if quantization errors of numerically adjacent values exist for corresponding digital video data of said first and second lines of video based on the determination results of said steps a) through c).

8. The method as set forth in claim 7, wherein, said step a) comprises the steps of receiving said first and second lines of video, determining whether digital video data of said first and second lines of video have identical pixel values, and outputting a logic one for a first condition signal (pid) if said digital video data of said first and second lines of video are determined as having different pixel values;

said step b) comprises the steps of receiving said first and second lines of video, determining whether corresponding digital video data of said first and second lines of video are members of said list of data_in values of said digital video data shifting/modifying function that cause quantization errors, and outputting a logic one for a second condition signal (l1) and a logic one for a third condition signal (l2) if said corresponding digital video data of said first and second lines of video are determined to be members of said list respectively;

said step c) comprises the steps of receiving said first and second lines of video, determining whether corresponding digital video data of said first and second lines of video are numerically adjacent to each other, and outputting a logic one for a fourth and a fifth condition signal (n1 and n2) if said corresponding digital video data of said first and second lines of video are determined to be numerically adjacent to each other;

said step d) comprises the steps of receiving said pid, l1, l2, n1 and n2 condition signals, determining if all condition signals comprise logic ones in at least one combination of said pid, l1, l2 condition signals and a selected one of said n1 and n2 condition signals, and outputting a logic one for a sixth condition signal (QE) if all condition signals are determined to comprise logic ones for at least one combination of said pid, l1, l2 condition signals and a selected one of said n1 and n2 condition signals, indicating a quantization error of numerically adjacent values is detected for adjacent pixels in said dimension of pixel adjacency.

9. The method as set forth in claim 8, wherein, said pid condition signal in said step a) is outputed by performing an XOR operation on pixel values of said first and second lines of video;

said l1 and l2 condition signals in said step b) are outputed by looking up corresponding digital video data of said first and second lines of video in a potential quantization error lookup table storing said list of data_in values of said digital video data shifting/modifying function that cause quantization errors;

said n1 and n2 condition signals of said step c) are outputed by incrementing digital video data of said first and second lines of video, and looking up said incremented digital video data of said first and second lines of video with their corresponding pre-increment digital video data of said second and first lines of video in value equivalency lookup tables;

said QE condition signal in said step d) is outputed by performing an OR operation on a seventh and a eighth condition signal (qe1 and qe2), said qe1 condition signal being outputed by performing an AND operation on said pid, l1, l2 and n1 condition signals, said qe2 condition signal being outputed by performing an AND operation on said pid, l1, l2 and n2 condition signals.

10. The method as set forth in claim 7, wherein, said dimension of pixel adjacency is a vertical dimension of pixel adjacency, said step a) comprises the steps of determining whether digital video data of a current line and a line delayed video have identical pixel values, said current line and line delayed video being synchronized in said vertical dimension of pixel adjacency;

said step b) comprises the steps of determining whether corresponding digital video data of said current line and line delayed video are members of said list of data_in values of said digital video data shifting/modifying function that cause quantization errors;

said step c) comprises the steps of determining whether corresponding digital video data of said current line and line delayed video are numerically adjacent to each other; and said step d) comprises the steps of determining if quantization errors of numerically adjacent values exist for corresponding digital video data of said current line and line delayed video based on the determination results of said steps a) through c).

11. The method as set forth in claim 7, wherein, said dimension of pixel adjacency is a horizontal dimension of pixel adjacency, said step a) comprises the steps of determining whether digital video data of a current line and a pixel delayed video have identical pixel values, said current line and pixel delayed video being synchronized in said horizontal dimension of pixel adjacency;

said step b) comprises the steps of determining whether corresponding digital video data of said current line and pixel delayed video are members of said list of data_in values of said digital video data shifting/modifying function that cause quantization errors;

said step c) comprises the steps of determining whether corresponding digital video data of said current line and pixel delayed video are numerically adjacent to each other; and said step d) comprises the steps of determining if quantization errors of numerically adjacent values exist for corresponding digital video data of said current line and pixel delayed video based on the determination results of said steps a) through c).

12. The method as set forth in claim 7, wherein, said dimension of pixel adjacency is a temporal dimension of pixel adjacency, said step a) comprises the steps of determining whether digital video data of a current line and a frame delayed video have identical pixel values, said current line and frame delayed video being synchronized in said temporal dimension of pixel adjacency;

said step b) comprises the steps of determining whether corresponding digital video data of said current line and frame delayed line video are members of said list of data_in values of said digital video data shifting/modifying function that cause quantization errors;

said step c) comprises the steps of determining whether corresponding digital video data of said current line and frame delayed video are numerically adjacent to each other; and said step d) comprises the steps of determining if quantization errors of numerically adjacent values exist for corresponding digital video data of said current line and frame delayed video based on the determination results of said steps a) through c).

13. The method as set forth in claim 7, wherein, said method further comprises the step of:

e) conditionally modifying said determinations made in said step d) to prevent successive dynamic companding of data_in values of said first and second lines of video to identical data_out values, said determinations made in said step d) being used to selectively generate dynamic companding values for said digital video data of said first line of video.

14. The method as set forth in claim 13, wherein, said step d) comprises enabling a quantization error detection condition signal (DRE) for said first line of video whenever determining said quantization errors of numerically adjacent values existed for corresponding digital video data of said first and second lines of video;

said step e) comprises receiving said DRE condition signal of said first line of video, selectively generated dynamic companding values (DCVs) for digital video data of said first line of video based on said DRE condition signal, prior compensated quantization error detection indicator values (DRE's) of said second line of video, and prior selectively dynamic companded data_out values of said second line of video, determining if a plurality of compensation conditions exist based on said received DRE condition signal, DCVs, DRE's, and selectively dynamic companded data_out values, and modifying said DRE condition signal based on said compensation condition determination results.

15. The method as set forth in claim 14, wherein, said DRE condition signal is modified in said step e) if (e.c1) said DRE condition signal is enabled for a current pixel of said first line of video, and (e.c2) said DRE' of the adjacent pixel in said second line of video is also enabled, and (e.c3) said DCV of the adjacent pixel in said second line of video is the same as the DCV of said current pixel of said first line of video;

said DRE condition signal modification in said step e) comprises disabling said enabled DRE condition signal.

16. In a digital video system comprising a plurality of digitized lines of video, an apparatus for detecting quantization errors of numerically adjacent values of digital video data of adjacent pixels in a first and a second dimension of pixel adjacency, said apparatus comprising:

a) first detection means for detecting quantization errors of numerically adjacent values of digital video data of a first and a second line of video in said first dimension of pixel adjacency, said first and second lines of video being synchronized in said first dimension of pixel adjacency;

b) second detection means for detecting quantization errors of numerically adjacent values of digital video data of said first and a third line of video in said second dimension of pixel adjacency, said first and third lines of video being synchronized in said second dimension of pixel adjacency; and c) third detection means coupled to said first and second detection means for detecting quantization errors of numerically adjacent values of corresponding digital video data of said first and second lines of video, and said first and third lines of video, based on the detection results of said first and second detection means.

17. The apparatus as set forth in claim 16, wherein, said first detection means receives digital video data of said first and second lines of video, detects quantization errors of numerically adjacent values of corresponding digital video data of said first and second lines of video, and outputs a logic one for a first condition signal (QE1);

said second detection means receives digital video data of said first and third lines of video, detects quantization errors of numerically adjacent values of corresponding digital video data of said first and third lines of video, and outputs a logic one for a second condition signal (QE2); and said third detection means receives said QE1 and QE2 condition signals, determines if at least one of said QE1 and QE2 condition signals comprises a logic one, and outputs an enabled third condition signal (DRE) if at least one of said QE1 and QE2 condition signals is determined to comprise a logic one, indicating a quantization error of numerically adjacent values is detected in adjacent pixels of said first and second dimensions of pixel adjacency.

18. The apparatus as set forth in claim 17, wherein, said third detection means comprises an OR gate receiving said QE1 and QE2 condition signals, and outputting said DRE condition signal.

19. The apparatus as set forth in claim 16, wherein, said first and second dimensions of pixel adjacency are vertical and horizontal dimensions of pixel adjacency;

said first detection means detects quantization errors of numerically adjacent values of digital video data of a current line and a line delayed video in said vertical dimension of pixel adjacency, said current line and line delayed video being synchronized in said vertical dimension of pixel adjacency;

said second detection means detects quantization errors of numerically adjacent values of digital video data of said current line and a pixel delayed video in said horizontal dimension of pixel adjacency, said current line and pixel delayed video being synchronized in said horizontal dimension of pixel adjacency; and said third detection means detects quantization errors of numerically adjacent values of corresponding digital video data of said current line and line delayed video, and said current line and pixel delayed video, based on the detection results of said first and second detection means.

20. The apparatus as set forth in claim 16, wherein, said first and second dimensions of pixel adjacency are vertical and temporal dimensions of pixel adjacency;

said first detection means detects quantization errors of numerically adjacent values of digital video data of a current line and a line delayed video in said vertical dimension of pixel adjacency, said current line and line delayed video being synchronized in said vertical dimension of pixel adjacency;

said second detection means detects quantization errors of numerically adjacent values of digital video data of said current line and a frame delayed video in said temporal dimension of pixel adjacency, said current line and frame delayed video being synchronized in said temporal dimension of pixel adjacency; and said third detection means detects quantization errors of numerically adjacent values of corresponding digital video data of said current line and line delayed video, and said current line and frame delayed video, based on the detection results of said first and second detection means.

21. The apparatus as set forth in claim 16, wherein, said first and second dimensions of pixel adjacency are horizontal and temporal dimensions of pixel adjacency;

said first detection means detects quantization errors of numerically adjacent values of digital video data of a current line and a pixel delayed video in said horizontal dimension of pixel adjacency, said current line and pixel delayed video being synchronized in said horizontal dimension of pixel adjacency;

said second detection means detects quantization errors of numerically adjacent values of digital video data of said current line and a frame delayed video in said temporal dimension of pixel adjacency, said current line and frame delayed video being synchronized in said temporal dimension of pixel adjacency; and said third detection means detects quantization errors of numerically adjacent values of corresponding digital video data of said current line and pixel delayed video, and said current line and frame delayed video, based on the detection results of said first and second detection means.

22. The apparatus as set forth in claim 16, wherein, said apparatus further comprises:

d) compensation corrector means coupled to said third detection means for conditionally modifying said detections made by said third detection means to prevent successive dynamic companding of input values (data_in) of said first and second lines of video, and said first and third lines of video, to identical output values (data_out) values, said detections made by said third detection means being used to selectively generate dynamic companding values for said digital video data of said first line of video.

23. The apparatus as set forth in claim 22, wherein, said third detection means enables a quantization error detection condition signal (DRE) for said first line of video whenever detecting said quantization errors of numerically adjacent values existed for corresponding digital video data of said first and second lines of video, and said first and third lines of video;

said digital video system further comprises a dynamic companding value generator coupled to said third detection means for selectively generating dynamic companding values (DCVs) for digital video data of said first line of video based on said DRE condition signal, a first frame memory coupled to said compensation corrector means for storing prior compensated quantization error detection indicator values (DRE's) of said second and third lines of video, and a second frame memory coupled to said dynamic companding value generator for storing prior selectively dynamic companded data_out values of said second and third lines of video;

said compensation corrector means being further coupled to said dynamic companding value generator and said second frame of memory receives said DRE condition signal and DCVs of said first line of video, and said DRE's and said selectively dynamic companded data_out values of said second and third lines of video, determines if a plurality of compensation conditions exist based on said received DRE condition signal, DCVs, DRE's, and selectively dynamic companded data_out values, and modifies said DRE condition signal based on said compensation condition determination results.

24. The apparatus as set forth in claim 23, wherein, said compensation corrector modifies said DRE condition signal if (d.c1) said DRE condition signal is enabled for a current pixel of said first line of video, and (d.c2) said DRE' of at least one of the adjacent pixels in said second and third lines of video is also enabled, and (d.c3) said DCV of the adjacent pixel is the same as the DCV of said current pixel of said first line of video for at least one of the cases where the DRE' of the adjacent pixel is also enabled;

said compensation corrector modifies said DRE condition signal by disabling said enabled DRE condition signal.

25. In a digital video system comprising a plurality of digitized lines of video, a method for detecting quantization errors of numerically adjacent values of digital video data of adjacent pixels in a first and a second dimension of pixel adjacency, said method comprising the steps of:

a) detecting quantization errors of numerically adjacent values of digital video data of a first and a second line of video in said first dimension of pixel adjacency, said first and second lines of video being synchronized in said first dimension of pixel adjacency;

b) detecting quantization errors of numerically adjacent values of digital video data of said first and a third line of video in said second dimension of pixel adjacency, said first and third lines of video being synchronized in said second dimension of pixel adjacency; and c) detecting quantization errors of numerically adjacent values of corresponding digital video data of said first and second lines of video, and said first and third lines of video, based on the detection results of said first and second detection means.

26. The method as set forth in claim 25, wherein, said step a) comprises the steps of receiving digital video data of said first and second lines of video, detecting quantization errors of numerically adjacent values of corresponding digital video data of said first and second lines of video, and outputting a logic one for a first condition signal (QE1);

said step b) comprises the steps of receiving digital video data of said first and third lines of video, detecting quantization errors of numerically adjacent values of corresponding digital video data of said first and third lines of video, and outputting a logic one for a second condition signal (QE2); and said step c) comprises the steps of receiving said QE1 and QE2 condition signals, determining if at least one of said QE1 and QE2 condition signals comprises a logic one, and outputting an enabled third condition signal (DRE) if at least one of said QE1 and QE2 condition signals is determined to comprise a logic one, indicating a quantization error of numerically adjacent values is detected in adjacent pixels of said first and second dimensions of pixel adjacency.

27. The method as set forth in claim 26, wherein, said DRE condition signal in said step c) is outputed by performing an OR operation on said QE1 and QE2 condition signals.

28. The method as set forth in claim 25, wherein, said first and second dimensions of pixel adjacency are vertical and horizontal dimensions of pixel adjacency;

said step a) comprises the steps of detecting quantization errors of numerically adjacent values of digital video data of a current line and a line delayed video in said vertical dimension of pixel adjacency, said current line and line delayed video being synchronized in said vertical dimension of pixel adjacency;

said step b) comprises the steps of detecting quantization errors of numerically adjacent values of digital video data of said current line and a pixel delayed video in said horizontal dimension of pixel adjacency, said current line and pixel delayed video being synchronized in said horizontal dimension of pixel adjacency; and said step c) comprises the steps of detecting quantization errors of numerically adjacent values of corresponding digital video data of said current line and line delayed video, and said current line and pixel delayed video, based on the detection results of said steps a) and b).

29. The method as set forth in claim 25, wherein, said first and second dimensions of pixel adjacency are vertical and temporal dimensions of pixel adjacency;

said step a) comprises the steps of detecting quantization errors of numerically adjacent values of digital video data of a current line and a line delayed video in said vertical dimension of pixel adjacency, said current line and line delayed video being synchronized in said vertical dimension of pixel adjacency;

said step b) comprises the steps of detecting quantization errors of numerically adjacent values of digital video data of said current line and a frame delayed video in said temporal dimension of pixel adjacency, said current line and frame delayed video being synchronized in said temporal dimension of pixel adjacency; and said step c) comprises the steps of detecting quantization errors of numerically adjacent values of corresponding digital video data of said current line and line delayed video, and said current line and frame delayed line video, based on the detection results of said steps a) and b).

30. The method as set forth in claim 25, wherein, said first and second dimensions of pixel adjacency are horizontal and temporal dimensions of pixel adjacency;

said step a) comprises the steps of detecting quantization errors of numerically adjacent values of digital video data of a current line and a pixel delayed video in said horizontal dimension of pixel adjacency, said current line and pixel delayed video being synchronized in said horizontal dimension of pixel adjacency;

said step b) comprises the steps of detecting quantization errors of numerically adjacent values of digital video data of said current line and a frame delayed video in said temporal dimension of pixel adjacency, said current line and frame delayed video being synchronized in said temporal dimension of pixel adjacency; and said step c) comprises the steps of detecting quantization errors of numerically adjacent values of corresponding digital video data of said current line and pixel delayed video, and said current line and frame delayed video based on the detection results of said steps a) and b).

31. The method as set forth in claim 25, wherein, said method further comprises the step of:

d) conditionally modifying said detections in said step c) to prevent successive dynamic companding of input values (data_in) of said first and second lines of video to identical output values (data_out) said detections in said step c) being used to selectively generate dynamic companding values for said digital video data of said first line of video.

32. The method as set forth in claim 31, wherein, said step c) comprises enabling a quantization error detection condition signal (DRE) for said first line of video whenever determining said quantization errors of numerically adjacent values existed for corresponding digital video data of said first and second lines of video, and said first and third lines of video;

said step d) comprises receiving said DRE condition signal of said first line of video, selectively generated dynamic companding values (DCVs) for digital video data of said first line of video based on said DRE condition signal, prior compensated quantization error detection indicator values (DRE's) of said second and third lines of video, and prior selectively dynamic companded data_out values of said second and third lines of video, determining if a plurality of compensation conditions exist based on said received DRE condition signal, DCVs, DRE's, and selectively dynamic companded data_out values, and modifying said DRE condition signal based on said compensation condition determination results.

33. The method as set forth in claim 32, wherein, said DRE condition signal is modified in said step d) if (d.c1) said DRE condition signal is enabled for a current pixel of said first line of video, and (d.c2) said DRE' of the adjacent pixel in at least one of said second and third lines of video is also enabled, and (d.c3) said DCV of the adjacent pixel is the same as the DCV of said current pixel of said first line of video for at least one of the cases where the DRE' of the adjacent pixel is also enabled;

said DRE condition signal modification in said step d) comprises disabling said enabled DRE condition signal.

34. In a digital video system comprising a plurality of digitized lines of video, an apparatus for detecting video conditions caused by video operations performed on numerically related values of digital video data of related pixels in a dimension of pixel relationship, said apparatus comprising:

a) first condition determination means for determining whether digital video data of a first and a second line of video are numerically related to each other in value in a first predetermined manner, said first and second lines of video being synchronized in said dimension of pixel relationship;

b) second condition determination means for determining whether corresponding digital video data of said first and second lines of video are members of a list of digital video data upon which when said video operations are performed, cause said video conditions;

c) third condition determination means for determining whether corresponding digital video data of said first and second lines of video are numerically related to each other in values in a second predetermined manner; and d) fourth condition determination means coupled to said first, second and third condition determination means for determining if video conditions caused by video operations performed on numerically related values exist for corresponding digital video data of said first and second lines of video based on the determination results of said first, second and third condition determination means.

35. In a digital video system comprising a plurality of digitized lines of video, a method for detecting video conditions caused by video operations performed on numerically related values of digital video data of related pixels in a dimension of pixel relationship, said method comprising the steps of:

a) determining whether digital video data of a first and a second line of video are numerically related to each other in value in a first predetermined manner, said first and second lines of video being synchronized in said dimension of pixel relationship;

b) determining whether corresponding digital video data of said first and second lines of video are members of a list of digital video data upon which when said video operations are performed, cause said video conditions;

c) third condition determination means for determining whether corresponding digital video data of said first and second lines of video are numerically related to each other in value in a second predetermined manner; and d) fourth condition determination means coupled to said first, second and third condition determination means for determining if video conditions caused by video operations performed on numerically related values exist for corresponding digital video data of said first and second lines of video based on the determination results of said first, second and third condition determination means.

36. The apparatus as set forth in claim 1, wherein, said apparatus further comprises:

e) compensation corrector means coupled to said fourth condition determination means for conditionally modifying said determinations made by said fourth condition determination means to prevent successive dynamic companding of input values (data—in) of said first and second lines of video to identical output values (data—out) said determinations made by said fourth condition determination means being used to selectively generate dynamic companding values for said digital video data of said first line of video.

37. The apparatus as set forth in claim 36, wherein, said fourth condition determination means enables a quantization error detection condition signal (DRE) for said first line of video whenever determining said quantization errors of numerically adjacent values existed for corresponding digital video data of said first and second lines of video;

said digital video system further comprises a dynamic companding value generator coupled to said fourth condition determination means for selectively generating dynamic companding values (DCVs) for digital video data of said first line of video based on said DRE condition signal, a first frame memory coupled to said compensation corrector means for storing prior compensated quantization error detection indicator values (DRE's) of said second line of video, and a second frame memory coupled to said dynamic companding value generator for storing prior selectively dynamic companded data—out values of said second line of video;

said compensation corrector means being further coupled to said dynamic companding value generator and said second frame of memory receives said DRE condition signal and DCVs of said first line of video, and said DRE's and said selectively dynamic companded data—out values of said second line of video, determines if a plurality of compensation conditions exist based on said received DRE condition signal, DCVs, DRE's, and selectively dynamic companded data—out values, and modifies said DRE condition signal based on said compensation condition determination results.

38. The apparatus as set forth in claim 37, wherein, said compensation corrector modifies said DRE condition signal if (e.c1) said DRE condition signal is enabled for a current pixel of said first line of video, and (e.c2) said DRE' of the adjacent pixel in said second line of video is also enabled, and (e.c3) said DCV of the adjacent pixel in said second line of video is the same as the DCV of said current pixel of said first line of video;

said compensation corrector modifies said DRE condition signal by disabling said enabled DRE condition signal.

* * * * *